United States Patent [19]

Minagawa et al.

[11] 4,221,687
[45] Sep. 9, 1980

[54] ANTI-YELLOWING COMPOSITION

[75] Inventors: Motonobu Minagawa, Koshigaya; Tetsuo Sekiguchi, Hasusa; Kenji Nakazawa, Urawa, all of Japan

[73] Assignee: Argus Chemical Corp., Brooklyn, N.Y.

[21] Appl. No.: 921,814

[22] Filed: Jul. 3, 1978

[30] Foreign Application Priority Data

Jul. 7, 1977 [JP] Japan .................................. 52-81219
Oct. 26, 1977 [JP] Japan ................................ 52-128859

[51] Int. Cl.² .................................................. C08K 5/07
[52] U.S. Cl. .......................... 260/23 XA; 252/400 A; 260/45.7 R; 260/45.7 ST; 260/45.75 E; 260/45.75 W; 260/45.7 PH; 260/45.75 D; 260/45.75 P; 260/45.85 R
[58] Field of Search ............. 260/45.7 R, 45.7 PH, 260/45.7 ST, 45.7 S, 45.75 W, 45.75 P, 45.75 D, 45.75 E, 45.85 R, 23 XA; 252/400 A

[56] References Cited

U.S. PATENT DOCUMENTS

| | | | |
|---|---|---|---|
| 2,140,518 | 12/1938 | Doolittle | 260/45.75 T |
| 2,179,973 | 11/1939 | Alexander | 260/45.7 R |
| 2,364,410 | 12/1944 | Whittaker | 260/45.75 W |
| 2,491,444 | 8/1949 | Cox | 260/45.9 E |
| 2,597,987 | 5/1952 | Harding | 260/45.75 T |
| 2,604,459 | 7/1952 | Jankowiak | 260/45.7 PH |
| 2,669,548 | 2/1954 | Darby | 260/45.75 W |
| 2,669,549 | 2/1954 | Darby | 260/45.75 W |
| 2,855,266 | 10/1958 | James | 260/42.49 |
| 2,868,765 | 1/1959 | Haefner et al. | 260/45.75 T |
| 3,492,267 | 1/1970 | Wood | 260/45.75 W |
| 3,575,905 | 4/1971 | Rhodes | 260/45.75 W |
| 3,975,356 | 8/1976 | Dickens | 260/45.7 ST |
| 4,041,015 | 8/1977 | Larkin | 260/45.7 S |
| 4,060,508 | 11/1977 | Sugahara et al. | 260/23 XA |
| 4,102,839 | 7/1978 | Crochemore et al. | 260/23 XA |
| 4,116,907 | 9/1978 | Shiohara et al. | 260/23 XA |
| 4,123,399 | 10/1978 | Gay | 260/23 XA |
| 4,123,400 | 10/1978 | Gay | 260/23 XA |

FOREIGN PATENT DOCUMENTS

7600213 7/1976 Netherlands.
1141971 5/1967 United Kingdom.

OTHER PUBLICATIONS

The Stabilization of Polyvinyl Chloride–Chevassus, 1963, pp. 26 to 73.

*Primary Examiner*—V. P. Hoke
*Attorney, Agent, or Firm*—Otto S. Kauder

[57] ABSTRACT

An anti-yellowing additive is provided for environmentally acceptable stabilized vinyl chloride polymer compositions from which arsenic, cadmium, lead, mercury, and thallium are substantially excluded, comprising at least one basic inorganic compound of lithium, sodium, potassium, magnesium, calcium, strontium, barium, zinc, titanium, aluminum, zirconium, or tin, and a 1,3-diketone compound represented by the formula

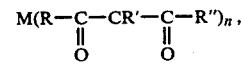

in which R is a hydrocarbon group having 1 to 18 carbon atoms, R' is a hydrogen atom, an acyl group

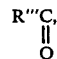

or a hydrocarbon group having 1 to 18 carbon atoms, R' is a hydrogen atom or a hydrocarbon group having 1 to 18 carbon atoms, M is a hydrogen or one of the metals lithium, sodium, potassium, magnesium, calcium, strontium, barium, zinc, aluminum, and antimony, and n is the valence of the metal from 1 to 3.

23 Claims, No Drawings

ANTI-YELLOWING COMPOSITION

BACKGROUND OF THE INVENTION

This invention relates to environmentally acceptable stabilized vinyl chloride polymer compositions from which arsenic, cadmium, lead, mercury, and thallium are substantially excluded, and to an anti-yellowing additive so such environmentally acceptable stabilized vinyl chloride polymer compositions to minimize undesirable yellowing during the process of fabricating and shaping such compositions into useful articles.

There is a voluminous literature on the stabilization of vinyl chloride polymers. Patent disclosures of materials stated to be useful in minimizing deterioration of vinyl chloride polymers on heating number well over one thousand. Among the more important heat stabilizers in commercial use are mild alkalis such as sodium carbonate, disodium phosphate, and sodium and potassium salts of partially esterified phosphoric acids; carboxylates and phenolates of zinc, cadmium, and the alkaline earth metals; inorganic and organic lead salts; organotin carboxylates. as disclosed by Quattlebaum in U.S. Pat. No. 2,307,157; organotin mercaptides as disclosed by Leistner in U.S. Pat. Nos. 2,641,588 and 2,641,598; various metal-free organic compounds such as the polyols, e.g. mannitol, sorbitol, glycerol, pentaerythritol, organic phosphites, 1,2-epoxides, e.g., soybean oil epoxide, isooctyl epoxy-stearate, and diglycidyl ether of 2,2-bis(p-hydroxyphenyl) propane, and nitrogen compounds, e.g., phenylurea, N, N'-diphenylthiourea, and 2-phenylindole. For detailed discussion of heat stabilizers for vinyl halide resins, reference may be made to the articles, L. I. Nass, in "Encyclopedia of Polymer Science and Technology" (N. Bikales, ed.) Vol. 12, pages 737 to 768 (1970); N. L. Perry "Barium-Cadmium Stabilization of Polyvinyl Chloride," *Rubber Age* 85 449–452 (June, 1959), and by H. Verity-Smith, *British Plastics* 27 176–179, 213–217, 307–311 (1954); the brochure by the same author *The Development of the Organotin Stabilizer* (Tin Research Institute, 1959) and the book *La Stabilistion des Chlorures de Polyvinyle* by F. Chevassus (Amphora, Paris, 1957).

Preponderant in quantity used for many years have been the lead salts, such as tribasic lead sulfate, normal and dibasic lead stearate, dibasic lead phthalate, dibasic leadphosphite, and basic lead carbonates and silicates. Vinyl chloride polymer compositions stabilized with lead compounds are recognized as outstanding in electical properties and good in color protection during long extended processing at high temperatures, while poor in clarity owing to the insolubility and pigmenting properties of the lead compounds. Next in quantity used have been the organic salt mixtures containing cadmium, as disclosed for example by W. Leistner, in U.S. Pat. No. 2,716,092 of Aug. 23, 1955, G. Mack in U.S. Pat. No. 2,935,491, of May 23, 1960 and J. Scullin in U.S. Pat. No. 3,390,112 of June 25, 1968. Cadmium containing stabilizers have provided excellent heat stability combined with outstanding clarity and resistance to weathering exposure. With the steady increase in usage of vinyl chloride polymer compositions and coincidentally increased concern about the accumulation of toxic materials in the human environment, there has developed a need to replace the lead and cadmium based stabilizers by environmentally more acceptable and no less effective stabilizers. The very favorable properties of the lead and cadmium containing stabilizers, however, have made it difficult to find equivalent replacements. In particular, vinyl chloride polymer compositions stabilized with materials other than lead and cadmium have been subject to objectionable yellowing even where the time to severe heat failure was relatively satisfactory.

J. Darby in U.S. Pat. No. 2,669,548 of Feb. 16, 1954 disclosed halogen-containing resin compositions having improved stability containing a mixture of a zinc salt and a calcium chelate derivative of a 1,3-dicarbonylic compound capable of keto-enol tautomerism. Zinc salts can be zinc salts of organic acids and zinc salts of weak inorganic acids, for example zinc acetate, zinc propionate, zinc octanoate, zinc ricinoleate stearate, and zinc salts of carbonic, silicic, and boric acids. Calcium chelates can be derivatives of betadiketones, betaketoacids, and the esters of betaketoacids, for example the calcium chelates of ethyl acetoacetate, phenyl acetoacetate, acetoacetic acid, acetylacetone, benzoylacetone, and diacetylacetone.

F. Ebel in U.S. Pat. 3,001,970 of Sept. 26, 1961 disclosed preventing the discoloration of polymers of vinylidene chloride in light by adding a small amount of a dibenzoylmethane of the general formula:

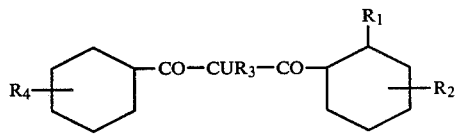

in which $R_1$ represents hydrogen or a hydroxyl radical, and $R_2$, $R_3$ and $R_4$ represents hydrogen or hydrophobic radicals. Such hydrophobic radicals are for example alkyl, cycloalkyl, aryl, aralkyl and halogen radicals.

British Pat. No. 1,141,971 of May 23, 1967 to W. R. Grace & Co. disclosed zinc complexes of beta-dicarbonyl compounds used as stabilizing additives for chlorine-containing polymers in general, and polyvinyl chloride in particular. The zinc complexes possess the general formula:

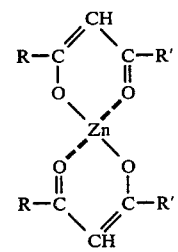

wherein R and R' are the same or different and are each hydrogen or an alkyl, alkoxy, phenyl or phenoxy group. Preferably when R represents an alkyl or alkoxy group, it contains 1 to 20 carbon atoms.

W. R. Pryer in U.S. Pat. No. 3,446,765 of May 27, 1969 disclosed that where unplasticized polyvinyl chloride compositions containing finely divided precipitated calcium carbonate discolor on exposure to light, one can prevent the discoloration by incorporating in the composition small amounts of basic compounds of metals, for example oxides of magnesium, zinc, and aluminum, particularly magnesium oxide. The only stabilizer present in a vinyl chloride polymer composition in which the favorable effect of the basic compound is demonstrated by Pryer is a barium/cadmium stabilizer.

L. Weisfeld in U.S. Pat. No. 3,493,536 of Feb. 3, 1970 disclosed that diaroylmethane compounds of the general formula C₆H₅CO—CHR—COC₆H₅ wherein R is hydrogen or a monovalent hydrocarbon radical provide stabilizing action against the sensitizing effect of bismuth or antimony compounds on chlorine-containing materials.

C. E. Parks in Bristish Pat. No. 1,229,521 of Apr. 21, 1971 disclosed a synergistic combination of tin mercaptide stabilizers with calcium oxide, calcium phenoxide, calcium hydroxide and calcium alcoholates, whereby smaller amounts of tin mercaptide may be used with the synergist to obtain the same degree of heat stability as with much larger amounts of the tin mercaptide. In British Pat. No. 1,229,522 Parks disclosed a similar combination of tin mercaptide stabilizers with magnesium oxide or hydroxide, and noted that with other stabilizer systems, for example calcium zinc organic acid salts, the addition of magnesium oxide contributed to decreased heat stability when used in combination with the calcium-zinc stabilizer.

Similarly, T. Jennings in U.S. Pat. No. 3,764,571 of Oct. 9, 1973 disclosed a stabilizer combination for vinyl chloride polymers of a sulfur containing organotin compound having the structural feature

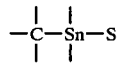

with a metal carboxylic acid salt having the formula (RCXX)nM in which R is a hydrocarbon or substituted hydrocarbon radical, X is oxygen or sulfur, n is an integral number from 1-2 and M is an alkali or alkaline earth metal, and a basic compound which can be an alkali or alkaline earth (i.e. Group I and IIa) metal oxide, hydroxide, carbonate, bicarbonate, thiocarbonate, sulfide, bisulfide, sulfite or bisulfite.

Netherlands specification No. 7600213 of July 13, 1976 to Rhone Poulenc Industries disclosed the possibility of preventing the thermal breakdown of vinyl chloride polymers by adding 0.1 to 5% by weight of the polymer of one or more carboxylic acid salts of 2-valent metals such as calcium, barium, zinc, lead, or cadmium and 0.05 to 5% by weight of an organic compound having the formula: $R_1$—CO—$CHR_2$—CO—$R_3$ in which $R_1$ and $R_3$, which can be alike or different, represent linear or branched alkyl or alkenyl groups with up to 30 carbon atoms, arylkyl groups with 7 to 36 carbon atoms, or aryl or cycloaliphatic groups with less than 14 carbon atoms, optionally substituted with halogen atoms, aryl or cycloaliphatic groups, methyl or ethyl groups; aliphatic $R_1$ and $R_3$ groups can also be modified by the presence of one or more —O—,

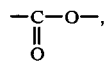

or —CO— groups, or taken together represent a 2-valent alkylene group having two to five carbon atoms; also, one of the groups $R_1$ and $R_3$ can be a hydrogen atom; $R_2$ is a hydrogen atom, an alkyl or alkenyl group with up to 30 carbon atoms which can include —O—,

and —CO— groups, a group R—CO—$R_4$ where $R_4$ is an alkyl group with 1 to 30 carbon atoms or an aryl group when $R_1$ and $R_3$ are non-aromatic, or a group having the formula —$R_5$—CH(—CO—$R_1$)—CO—$R_3$ in which $R_5$ is an alkylene group with 1 to 6 carbon atoms. The combination of carboxylic acid metal salt and 1,3-dicarbonyl compound is stated to be superior to an equimolar quantity of 1,3-dicarbonyl compound metal chelate.

SUMMARY OF THE INVENTION

In accordance with this invention, environmentally acceptable stabilized vinyl chloride polymer compositions are prepared from which environmentally objectionable metals such as arsenic, cadmium, lead, mercury, and thallium are excluded. The exclusion of the objectionable metals is accomplished by avoiding the use of previously irreplaceable cadmium and lead based stabilizers and holding the level of unavoidable incidental contamination by objectionable metals to the lowest practicable amount, usually governed by the natural impurity levels found in metal compound starting materials used in the preparation of vinyl chloride polymer stabilizers based on environmentally acceptable metals such as zinc, tin, calcium, barium, lithium, sodium, potassium, aluminum, strontium, antimony and magnesium. Thus the use of a typical lead based stabilizer formulation in polyvinyl chloride plastic results in a lead content of 25,000 to 50,000 mg lead per kilogram of plastic while the use of typical cadmium containing stabilizer formulation contributes 200 to 2000 mg cadmium per kilogram of plastic. The use, on the other hand, of stabilizers made from available commercial grades of the environmentally acceptable metals without addition of compounds of the listed objectionable metals contributes per kilogram of plastic 10 mg or less of arsenic, cadmium, lead, mercury, and thallium combined. Accordingly, environmentally acceptable stabilized vinyl chloride polymer compositions are defined as stabilized vinyl chloride polymers compositions containing not more than 10 mg of arsenic, cadmium, lead, mercury, and thallium combined per kilogram of composition.

Also in accordance with this invention, an anti-yellowing additive is added to prevent objectionable yellowing of environmentally acceptable stabilized vinyl chloride polymer compositions as above defined. The quantity of anti-yellowing additive needed is modest, ranging from 0.02 part by weight to 20 parts by weight per 100 parts by weight of vinyl chloride polymer. The anti-yellowing additive comprises in combination (A) at least one basic inorganic compound of lithium, sodium, potassium, magnesium, calcium, strontium, barium, zinc, titanium, zirconium, or tin; and (B) for each part by weight of basic inorganic compound 0.01 to 1 part by weight of a 1,3-diketone compound represented by the formula

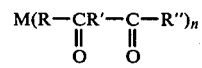

in which R is a hydrocarbon group, an alkoxyhydrocarbon group or an alkylenedioxyhydrocarbon group having up to 18 carbon atoms; R' is a hydrogen atom, an acyl group

where R''' is alkyl or aryl, or a hydrocarbon group having up to 18 carbon atoms; R'' is a hydrogen atom or a hydrocarbon group, a halohydrocarbon group, an alkoxyhydrocarbon group or an alkylenedioxyhydrocarbon group having up to 18 carbon atoms; M is hydrogen or a metal selected from the group consisting of lithium, sodium, potassium, magnesium, calcium, strontium, barium, zinc, aluminum, and antimony; and n is an integer from 1 to 3 depending on the valence of M.

Vinyl chloride polymer compositions containing the anti-yellowing additive of this invention are satisfactorily stabilized against deterioration during processing and the subsequent use with conventional stabilizers other than lead or cadmium compounds. Such stabilizers are used in concentrations of 0.1 to about 10 parts by weight per 100 parts by weight of vinyl chloride polymer and include 1,2-epoxides, organotin compounds, organic phosphites, and salts of hydrocarbon-substituted phenols and/or non-nitrogenous monocarboxylic acids having 6 to 30 carbon atoms with metals other than lead and cadmium.

DESCRIPTION OF THE PREFERRED EMBODIMENTS

The basic inorganic metal compound component (A) of the anti-yellowing composition of this invention is characterized by limited solubility in water and controlled alkalinity. When 1 part by weight of basic inorganic metal compound is mixed with 100 parts of water, it is not necessary that a clear solution be obtained, but the mixture, whether suspension or solution, has a pH in the range from 7.4 to 13.0. Accordingly, the basic inorganic metal compound can be an oxide, hydroxide, or basic salt of an inorganic oxyacid such as boric acid, nitric acid, nitrous acid, phosphoric acid, phosphorous acid, silicic acid, sulfuric acid, and sulfurous acid. The metal component of the basic inorganic metal compound can be one or more of aluminum, barium, calcium lithium, magnesium, potassium, sodium, strontium, tin, titanium, zinc, and zirconium. Thus metal basic inorganic compounds that can be used as a component of the anti-yellowing composition of this invention include metal hydroxides such as $Mg(OH)_2$, $Ca(OH)_2$, $Ba(OH)_2$ and $Al(OH)_3$, metal oxides such as $ZrO_2$, $MgO$, $CaO$, $BaO$, $Al_2O_3$, and $SnO_2$ and metal basic inorganic acid salts such as $3CaO.Na_3PO_4$, $5CaO.Na_2HPO_4$, $MgO.Mg_3(PO_4)_2$, $3CaO.Ca_3(PO_4)_2$, $Ca(OH)_2.Ca_3(PO_4)_2$, $Ba(OH)_2.Ca_3(PO_4)_2.3H_2O$, $Sr(OH)_2.Sr_3(PO_4)_2$, $BaO.Ba_3(PO_4)_2$, $3Ba(OH)_2.Ba_3(PO_4)_2$, $ZnO.Zn_3(PO_4)_2$, $2ZnO.Ba_3(PO_4)_2$, $Al_2O_3.AlPO_4$, $3SnO.Sn_3(PO_4)_2$, $Ba(OH)_2.NaHPO_3$, $5CaO.NaHPO_3$, $3Ba(OH)_2.K_2PHO_3$, $MgO.MgPHO_3$, $5Mg(OH)_2.MgPHO_3$, $CaO.CaPHO_3$, $3Ca(OH)_2CaPHO_3$, $Ba(OH)_2.CaPHO_3$, $BaO.BaPHO_3$, $2Ba(OH)_2.BaPHO_3$, $3Ba(OH)_2.BaPHO_3.3H_2O$, $ZnO.ZnPHO_3$, $ZnO.3CaPHO_3$, $TiO_2.Ti(PHO_3)_2$, $Al_2O_3.Al_2(PHO_3)_3$, $3ZrO_2Zr(PHO_3)_2$, $SnO.SnPHO_3$, $3SnO.SnPHO_3$, $Mg(OH)_2.Mg_2SiO_4$, $3MgO.MgSiO_3$, $MgO.K_2SiO_3$, $CaO.Ca_2SiO_4$, $3CaO.Li_2SiO_3$, $3CaO.CaSi_2O_5$, $2Ca(OH)_2.Ca_2Si_3O_8$, $SrO.SrSiO_3$, $5BaO.Ba_2SiO_4$, $Ba(OH)_2.Ba_2SiO_4.6H_2O$, $Ba(OH)_2.BaSiO_3$, $3Ba(OH)_2.BaSi_2O_5$, $3BaO.Ba_2SiO_4$, $Ba(OH)_2.CaSiO_3$, $2ZnO.ZnSiO_3$, $ZnO.3CaSiO_3$, $CaO.Sn_2SiO_4$, $Mg(OH)_2.Mg(NO_3)_2$, $3CaO.Ca(NO_3)_2$, $2Ca(OH)_2.Ca(NO_2)_2.5H_2O$, $3BaO.Ba(NO_3)_2$, $Ba(OH)_2.Na_2SO_4$, $ZnO.K_2SO_4$, $3CaO.K_2SO_3$, $Mg(OH)_2.MgSO_4$, $5MgO.MgSO_3$, $2MgO.MgSO_3$, $MgO.CaSO_3$, $5CaO.CaSO_4$, $Ca(OH)_2.CaSO_4$, $3CaO.CaSO_3$, $SrO.SrSO_3$, $3BaO.BaSO_4$, $3BaO.CaSO_3$, $Ba(OH)_2.BaSO_4$, $TiO_2.Ti(SO_4)_2$, $Al_2O_3.Al_2(SO_4)_3$, $Al(OH)_3.MgSO_4$, $MgO.Mg_3(BO_4)_2$, $CaO.Ca_3(BO_4)_2$, $5Ca(OH)_2.Ca_3(BO_4)_2$, $3CaO.Ca(BO_2)_2$, $3Ba(OH)_2.Ba_3(BO_4)_2$, $3BaO.BaB_4O_7$, $5Ba(OH)_2.Ba(BO_2)_2$.

The 1,3-diketone compound component (B) of the anti-yellowing additive of this invention is one of a class of known 1,3-diketone compounds represented by the formula

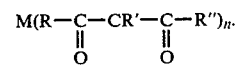

When in this formula M is a hydrogen atom, the formula becomes

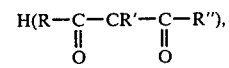

which is a way to indicate by a single expression that the hydrogen atom can be linked in more than one way, as in the tautomeric formulas I to III (i.e. formulas of compounds in readily movable equilibrium with one another)

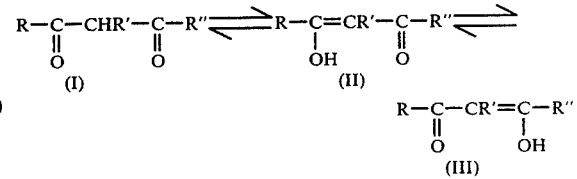

the latter two of which are identical when R and R'' are the same and non-identical when R and R'' are different. The relative proportions of tautomers I, II, and III in the 1,3-diketone compounds is a function of the identity or R and R''; for example the enol content (i.e. combined content of the C=C containing tautomers II and III) has been reported as 76.4% or diacetylmethane (R=R''=methyl) and 89.2% for acetylbenzoylmethane (R=methyl, R''=phenyl) (see A. Gero, J. Organic Chem. 1954, vol. 19, p. 1960–1970). When M is a metal, the formula

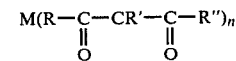

indicates that, while numerous structural formulas can be written differing in the location of various linkages (as illustrated for zinc acetylbenzoylmethane by formulas IV to VII below), all are equivalent representations of a single compound which is better represented as a "hybrid" of all formulas than by any single one. In formulas IV to VII, Ph represents phenyl and Me represents methyl.

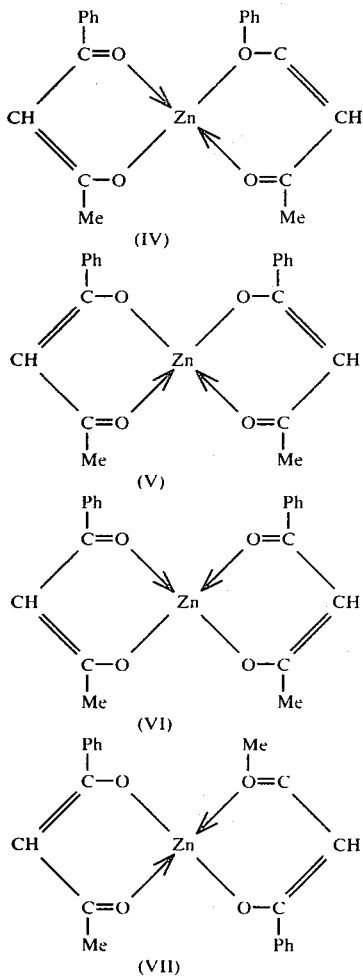

(IV)
(V)
(VI)
(VII)

In the formula of 1,3-diketone metal compounds, n is the valence of the metal and the number of 1,3-diketone groups per metal atom, as shown:

| M | Li | Na | K | Mg | Ca | Sr | Ba | Zn | Al | Sb |
|---|----|----|----|----|----|----|----|----|----|----|
| n | 1 | 1 | 1 | 2 | 2 | 2 | 2 | 2 | 3 | 3 |

Hydrocarbon groups R, R', R", and R''' can be open chain or cyclic and include such aliphatic, cycloaliphatic, and aromatic hydrocarbon groups as alkyl and alkenyl groups having 1 to 18 carbon atoms, cycloalkyl, cycloalkenyl and cycloalkylalkylene, and alkylcycloalkyl groups having 5 to 18 carbon atoms, and non-condensed aryl groups (including aralkyl and alkyaryl) having 6 to 18 carbon atoms, for example methyl, ethyl, propyl, isopropyl, isobutyl, n-butyl, s-butyl, t-butyl, 1-pentyl, 3-pentyl, 1-hexyl, 1-heptyl, 3-heptyl, 1-octyl, 2,4,4-trimethylpentyl, t-octyl, nonyl, decyl, tridecyl, pentadecyl, heptadec-8-en-1-yl, n-octadecyl, allyl, methallyl, 2-hexenyl, 1-methylcyclopentyl, cyclohexyl, cyclohexanepropyl, phenyl, m-tolyl, p-ethylphenyl, t-butylphenyl, benzyl, phenylpropyl and nonylbenzyl. Halohydrocarbon R, R', R", and R''' groups include dichloromethyl, heptafluoropropyl, p-bromophenyl, and 3,4-dichlorobenzyl. Alkoxyhydrocarbon R, R', R", and R''' groups include ethoxymethyl, n-butoxymethyl, 2-methoxyethyl, 2-methoxyphenyl, and 4-n-octoxyphenylbenzyl. R, R', R", and R''' alkylenedioxyhydrocarbon groups include 3(ethylenedioxypropyl) and 3,4-methylenedioxyphenyl. R' as well as either but not both of R and R" can be hydrogen.

Illustrative 1,3-diketone compounds that can be used in the anti-yellowing additive of this invention include the 1,3-diketones listed in Table I and the aluminum, antimony, barium, calcium lithium, magnesium, potassium, sodium, strontium, and zinc derivatives thereof.

Table 1

| No. | Structure | Name |
|---|---|---|
| No. 1 | $CH_3-\underset{\underset{O}{\|\|}}{C}-CH_2-\underset{\underset{O}{\|\|}}{C}-C_5H_{11}$ | Acetyl-hexanoyl-methane |
| No. 2 | $n-C_6H_{13}-\underset{\underset{O}{\|\|}}{C}-CH_2-\underset{\underset{O}{\|\|}}{C}-CH_3$ | Acetyl-heptanoyl-methane |
| No. 3 | $n-C_5H_{11}-\underset{\underset{O}{\|\|}}{C}-CH_2-\underset{\underset{O}{\|\|}}{C}-C_2H_5$ | Hexanoyl-propanoyl-methane |
| No. 4 | $CH_3-\underset{\underset{O}{\|\|}}{C}-CH_2-\underset{\underset{O}{\|\|}}{C}-C_{17}H_{35}$ | Acetyl-octadecanoyl-methane |
| No. 5 | $CH_3-\underset{\underset{O}{\|\|}}{C}-CH_2-\underset{\underset{O}{\|\|}}{C}-C_{13}H_{27}$ | Acetyl-tetradecanoyl-methane |
| No. 6 | $CH_3-\underset{\underset{O}{\|\|}}{C}-CH_2-\underset{\underset{O}{\|\|}}{C}-C_{11}H_{23}$ | Acetyl-dodecanoyl-methane |
| No. 7 | $C_{17}H_{35}-\underset{\underset{O}{\|\|}}{C}-CH_2-\underset{\underset{O}{\|\|}}{C}-C_{17}H_{35}$ | Di-octadecanoyl-methane |
| No. 8 | $C_7H_{15}-\underset{\underset{O}{\|\|}}{C}-CH_2-\underset{\underset{O}{\|\|}}{C}-C_3H_7$ | Butanoyl-octanoyl-methane |

-continued
No. 9 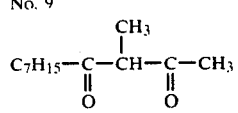 1-Acetyl-1-octanoyl-ethane
No. 10 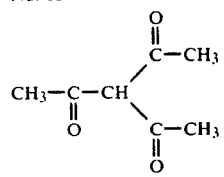 Triacetylmethane
No. 11 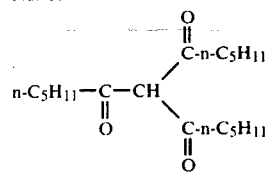 Trihexanoylmethane
No. 12 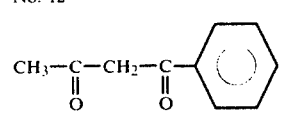 Acetyl-benzoyl-methane
No. 13 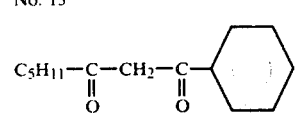 Hexanoyl-benzoyl-methane
No. 14 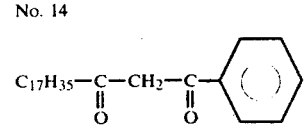 Octadecanoyl-benzoyl-methane
No. 15 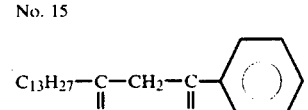 Tetradecanoyl-benzoyl-methane
No. 16 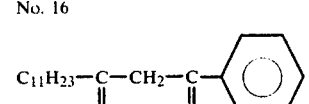 Dodecanoyl-benzoyl-methane
No. 17 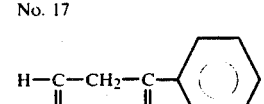 Formyl-benzoyl-methane
No. 18 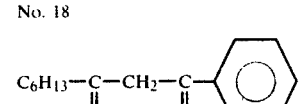 Heptanoyl-benzoyl-methane
No. 19 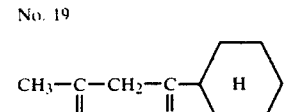 Acetyl-hexahydrobenzoylmethane
No. 20 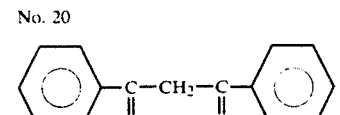 Dibenzoylmethane -continued No. 21 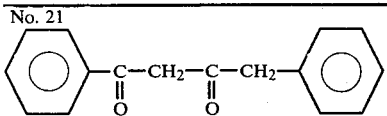 Phenylacetyl-benzoyl-methane No. 22 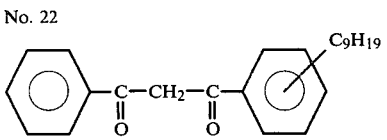 Benzoyl-nonylbenzoyl-methane No. 23 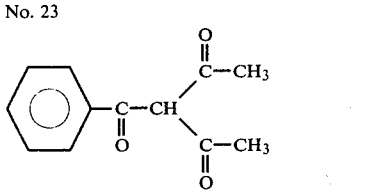 Benzoyldiacetyl-methane No. 24 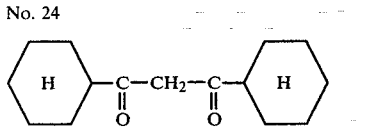 Di(hexahydrobenzoyl)methane No. 25 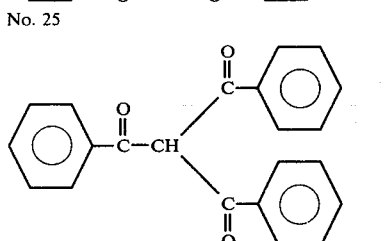 Tribenzoylmethane No. 26 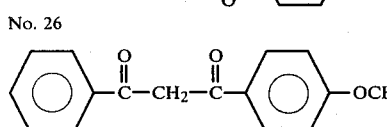 Benzoyl-p-methoxybenzoyl-methane No. 27 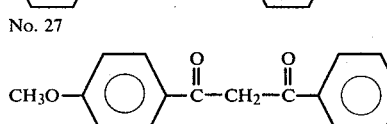 Di(p-methoxybenzoyl)methane No. 28 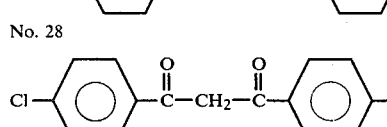 Di(p-chlorobenzoyl)methane No. 29 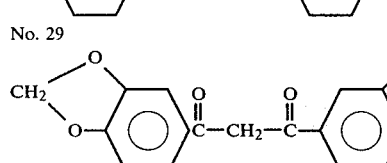 Di(3,4-methylenedioxybenzoyl)methane No. 30 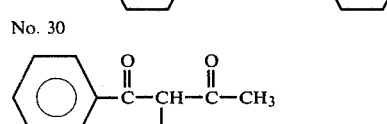 1-Acetyl-1-benzoylnonane No. 31 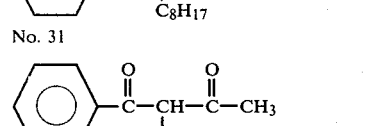 Alpha-acetyl-alpha-benzoyl-toluene

-continued

No. 32  Di(p-t-butylbenzoyl)methane t-C₄H₉—⟨O⟩—C(=O)—CH₂—C(=O)—⟨O⟩—t-C₄H₉

No. 33  Benzoyl-trifluoroacetyl-methane

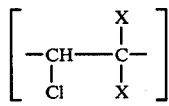
⟨O⟩—C(=O)—CH₂—C(=O)—CF₃

No. 34  Diacetylmethane

CH₃—C(=O)—CH₂—C(=O)—CH₃

No. 35  Acetyl-octanoyl-methane

C₇H₁₅—C(=O)—CH₂—C(=O)—CH₃

No. 36  Dipivaloylmethane t-C₄H₉—C(=O)—CH₂—C(=O)—t-C₄H₉

---

The anti-yellowing additive of this invention is useful in any environmentally acceptable stabilized vinyl chloride polymer. The term "vinyl chloride polymer" as used herein is inclusive of any polymer formed at least in part of the recurring group, $$\left[ \begin{array}{cc} & X \\ -CH- & -C- \\ | & | \\ Cl & X \end{array} \right]$$

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after chlorinated polyvinyl chlorides as a class, for example, those disclosed in British Patent No. 893,288 and also copolymers of vinyl chloride in a major proportion and other copolymerizable monomers in a minor porportion, such as copolymers of vinyl chloride and vinyl acetate, copolymers of vinyl chloride with maleic or fumaric acids or esters, and copolymers of vinyl chloride with styrene, propylene, ethylene, 1-hexene, or vinyl n-dodecyl ether. The invention also is applicable to mixtures of polyvinyl chloride in a major proportion with a minor proportion of other synthetic resins such as chlorinated polyethylene or copolymers of acrylonitrile with butadiene and styrene.

The invention is of application to the stabilization of rigid polyvinyl chloride resin compositions, that is, resin compositions which are formulated to withstand high processing temperatures, of the order of 190° C. and higher, and of plasticized polyvinyl chloride resin compositions of conventional formulation where resistance to heat distortion is not a requisite. The respective definition of rigid and plasticized resins are as follows. The rigid resins are those resins to which plasticizers are not added, and which are generally worked at about 190° C. The ASTM definition (1961 D-883, Part 9, page 804) is as follows:

"a plastic which has a stiffness or apparent modulus of elasticity greater than 7000 grams per square centimeter (100,000 psi) at 23° C."

The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil.

1,2-Epoxides that can be used to stabilize vinyl chloride polymer compositions containing the anti-yellowing additive of this invention include epoxidized triglyceride oils such as epoxysoybean oil, epoxylinseed oil, epoxidized fish oils and epoxidized tallow; epoxidized esters such as methyl, isobutyl, and 2-ethylhexyl epoxystearates, epoxidized butyl and isooctyl esters of tall oil fatty acids, and 3,4-epoxycyclohexanemethyl 3,4-epoxycyclohexanecarboxylate; epoxidized hydrocarbons such as epoxidized polybutadiene and 1,2,5-tris(epoxyethyl)benzene; and epoxidized ethers such as 1,2,3-tris(2',3'-epoxypropoxy)propane and 4,4'-isopropylidenebis(phenyl glycidyl ether). A comprehensive disclosure of 1,2-epoxide stabilizers by T. Sekiguchi in U.S. Pat. No. 4,105,627 of Aug. 8, 1978, column 8 line 48 to Col. 9 line 40 is here incorporated by reference.

Organotin compounds that can be used to stabilize vinyl chloride polymer compositions containing the anti-yellowing additive of this invention include dialkyltin oxides such as di-n-butyltin oxide and dimethyltin oxide; dialkyltin sulfides such as dimethyltin sulfide and di-n-octyltin sulfide; dialkyltin alcoholates such as di-n-butyltin di(2-butoxyethoxide), di-n-octyltindimethoxide, and 2,2-di-isobutyl-1,3,2-dioxastannolane; dialkyltin carboxylates such as dimethyltin distearate, dibutyltin dilaurate and di-n-octyltin maleate; dialkyltin mercaptides and mercaptoesters such as dibutyltin di-n-dodecylmercaptide, dimethyltin 2-decanoyloxyethylmercaptide, and di-n-octyltinbis(isooctylmercaptoacetate); monoalkyltin sulfides such as methyltin, n-butyltin, and n-octyltin sesquisulfides, and monoalkyltin mercaptides such as butyltintris(2-ethylhexyl 3-mercaptopropionate), methyltintris(2-nonanoyloxyethylmercaptide), and 2-ethylhexyltintris(isodecyl thioglycolate). A comprehensive disclosure of suitable sulfur linked organotin compounds by L. Brecker in U.S. Pat. No. 3,803,083 of April 9, 1974, col. 3 line 33 to col. 6 line 17 and a comprehensive disclosure of suitable organotin carboxylates by O. Kauder in U.S. Pat. No. 3,483,159 of Dec. 9, 1969, col. 2 line 48 to col. 5 line 58 are here incorporated by reference.

Organic phosphites that can be used to stabilize vinyl chloride polymer compositions containing the anti-yellowing additive of this invention include phenyl di-2-ethylhexyl phosphite, tri-isodecyl phosphite, and pentaerythritol diisooctyldiphosphite. A comprehensive disclosure of suitable organic phosphites by T. Sekiguchi in U.S. Pat. No. 4,105,627 of Aug. 8, 1978, column 9 line 41 to Col. 12 line 16 is here incorporated by reference.

Metal salts that can be used to stabilize vinyl chloride polymer compositions containing the anti-yellowing additive of this invention are preferably salts of at least one bivalent non-transition metal, such as barium, calcium, magnesium, strontium, stannous, tin and zinc.

In the salt, the acid can be any organic non-nitrogenous monocarboxylic acid having from six to twenty-four carbon atoms.

The aliphatic, aromatic, alicyclic and oxygen-containing heterocyclic organic acids are operable as a class. By the term "aliphatic acid" is meant any open chain carboxylic acid, substituted, if desired, with non-reactive groups, such as halogen, sulfur and hydroxyl. By the term "alicyclic" it will be understood that there is intended any cyclic acid in which the ring is non-aromatic and composed solely of carbon atoms, and such acids may if desired have inert, non-reactive substituents such as halogen, hydroxyl, alkyl radicals, alkenyl radicals and other carbocyclic ring structures condensed therewith. The oxygen-containing heterocyclic compounds can be aromatic or non-aromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, 3,5,5-trimethyl hexoic acid, capric acid, undecyclic acid, lauric acid, myristic acid, palmitic acid, margaric acid, stearic acid, oleic acid, ricinoleic acid, behenic acid, chlorocaproic acid, hydroxy-capric acid, ethyl acetoacetic acid, benzoic acid, phenyl-acetic acid, butylbenzoic acid, ethylbenzoic acid, propylbenzoic acid, hexylbenzoic acid, salicyclic acid, naphthoic acid, 1-naphth alene acetic acid, orthobenzoyl benzoic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

In combination with the above metal salts of organic acids, or in lieu thereof, a metal salt of a hydrocarbon-substituted phenol can be used. The hydrocarbon substituents contain from four to twenty-four carbon atoms each. The metal can be an alkali metal or alkaline earth metal such as sodium, potassium, lithium, calcium, strontium, magnesium and barium. Among such polyvalent metal phenolates there can be mentioned the magnesium, barium, calcium, strontium, tin and zinc salts of n-butyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, ortho or para phenyl phenol. The modified metal phenolates disclosed by M. Pollock in U.S. Pat. No. 3,630,979 of Dec. 28, 1971 and by M. Minagawa in U.S. Pat. No. 3,733,288 of May 15, 1973 are also suitable.

Mixtures of salts of various metals can be used, such as mixed zinc and tin salts with the alkaline earth metal salts, e.g., barium and zinc stearates, as in U.S. Pat. No. 2,446,976.

Preferred classes of additional stabilizers that can be used include the phenols, aliphatic polyhydroxy compounds; esters, amides, and hydrazides of thioalkylenedicarboxylic acids and nitrilotrialkylenetricarboxylic acids; ketoacetic acid compounds; and organic nitrogen compounds such as the esters of betaaminocrotonic acid, diphenylthiourea, and 2-phenylindole. Phenol stabilizers can be included with the stabilizer composition of this invention in amounts corresponding to 0.01 to about 0.2 parts per 100 parts of polymer being stabilized. Typical phenol stabilizers are butylated hydroxy-toluene (BHT), 4,4'-isopropylidenebisphenol, and 1,1,3-tris (2'-methyl-4'-hydroxy-5'-t-butylphenyl) butane. A comprehensive disclosure of phenol stabilizers at column 16 line 49 to column 21 line 8 of M. Minagawa U.S. Pat. No. 3,849,370 issued Nov. 19, 1974 is here incorporated by reference.

Aliphatic polyhydroxy compounds can be included with the stabilizer composition of this invention in amounts corresponding to 0.1 to about 1 part per 100 parts of polymer being stabilized. Typical aliphatic polyhydroxy compounds are glycerol, polyglycerol, monodi-, and tri-pentaerythritol, mannitol, sorbitol, and partial esters of these with saturated and unsaturated fatty acids having 6 to 22 carbon atoms.

The esters, amides, and hydrazides of thiodialkylene dicarboxylic acids and nitrilotri-alkylenetricarboxylic acids can be included with the stabilizer composition of this invention in amounts corresponding to 0.1 to about 1 part per 100 parts of polymer. Typical of these are dimethyl thiodipropionate, dilauryl and distearyl thiodipropionates, 2,2'-thiobis (acetyl ethanolamine), 3,3'-thiobis (propionyldiisopropanolamine, nitrilotriacetic acid (NTA) propylene glycol ester, NTA tris (ethylamide), NTA bis (hydroxyethyl) N-butylamide, 3,3'-thiodipropionyldihydrazide and 6,6'-thiodihexanoyldihydrazide. A comprehensive disclosure of thiodipropionate compounds that can be used from column 21 line 9 to column 22 line 65 of M. Minagawa U.S. Pat. No. 3,849,370 is here incorporated by reference.

Ketoacetic acid compounds that can be used with the stabilizer compositions of this invention in amounts of about 0.05 to about 0.5 parts per 100 parts of polymer being stabilized include 2-ethylhexyl acetoacetate, glyceryl tris (acetoacetate) and dehydroacetic acid. A comprehensive disclosure of ketoacetic acid compounds that can be used from column 2 line 32 to column 5 line 19 of U.S. Pat. No. 3,346,536 issued Oct. 10, 1967 is here incorporated by reference.

Organic nitrogen compounds that can be used with the stabilizer compositions of this invention in amounts of about 0.05 to about 0.5 parts per 100 parts of polymer being stabilized include 2-ethylhexyl 3-aminocrotonate, 1,4-butanediol bis (3-aminocrotonate) and 2,2'-thiodiethyl 3aminocrotonate; thiocarbanilide and 2-phenylindole, 1,3-dibutylthiourea, phenylurea, and p-ethoxyphenylurea.

The preparation of the stabilized polymer composition is easily accomplished by conventional procedures. The selected stabilizer combination along with such compounding ingredients as plasticizers, colors, lubricants, antistatic agents etc. as may be needed, is blended with the polymer being stabilized, using, for instance, plastic mixing rollers, at a temperature at which the mix is fluid and thorough blending facilitated, typically at from 120° to 180° C. for a time sufficient to form a homogeneous sheet, five minutes, usually. After the mass is formed, it is sheeted off in the usual way.

The following examples in the opinion of the inventors represent preferred embodiments of their invention.

EXAMPLE 1

In order to examine the anti-yellowing effect of the composition of the present invention, samples of 20×15 mm were cut off from the sheet of 1 mm in thickness prepared by calendering and compression molding in accordance with the following formulation. The heat stability test in a Geer oven at 190° C. was carried out. The heat stability results shown in Table-2 are the yellowness determined with the Hunter Colorimeter, higher numbers indicating more yellow samples.

| (FORMULATION) | |
|---|---|
| Polyvinyl chloride (Geon 103EP) | 100 parts by weight |
| Zn-Stearate | 0.3 |
| Ca-Stearate | 0.5 |
| $Ba_3(PO_4)_2 \cdot 5BaO$ | 2.5 |
| 1,3-diketone compound | 0.1 |

TABLE 2

| | | HEAT STABILITY (YELLOWNESS) | | | | |
|---|---|---|---|---|---|---|
| No. | 1,3-diketone | 0 Min. | 15 min. | 30 min. | 60 min. | 120 min. |
| Control 1-1 | None | 8 | 12 | 16 | 24 | 57 |
| Example 1-1 | No. 3(Table 1) | 5 | 8 | 10 | 14 | 33 |
| 1-2 | No. 5(Table 1) | 6 | 9 | 10 | 16 | 36 |
| 1-3 | No. 8(Table 1) | 6 | 10 | 11 | 14 | 34 |
| 1-4 | No. 9(Table 1) | 6 | 8 | 12 | 12 | 36 |
| 1-5 | No. 10(Table 1) | 5 | 8 | 10 | 14 | 32 |
| 1-6 | No. 12(Table 1) | 4 | 6 | 8 | 12 | 30 |
| 1-7 | No. 14(Table 1) | 6 | 8 | 10 | 14 | 38 |
| 1-8 | No. 19(Table 1) | 6 | 9 | 10 | 12 | 36 |
| 1-9 | No. 20(Table 1) | 4 | 6 | 8 | 12 | 30 |
| 1-10 | No. 23(Table 1) | 6 | 8 | 10 | 14 | 38 |
| 1-11 | No. 25(Table 1) | 6 | 10 | 10 | 14 | 34 |

These results show that the yellowing tendency of this rigid PVC formulation is minimized by the presence of both an inorganic base compound and a betadiketone compound in accordance with this invention. Equally treated samples according to the invention are throughout less yellow than samples of Control 1-1 lacking the beta-diketone componet. Moreover, the example 1-1, 1-4, 1-5, 1-6, 1-7, 1-9, and 1-10 samples heated 15 minutes at 190° C. and the example 1-6 and 1-9 samples heated 30 minutes are no more yellow than the *unexposed* sample of Control 1-1 and all samples containing stabilizer composition of this invention heated 30 minutes as well as the example 1-4, 1-8, and 1-9 samples heated 60 minutes are no more yellow than the 15 minute heated sample of Control 1-1. Accordingly, the stabilizer compositions of this invention represent remarkably effective environmentally acceptable stabilizers.

EXAMPLE 2

The same test as Example-1 was carried out in accordance with the following formulation.

The results are shown in Table-3.

| (FORMULATION) | |
|---|---|
| Polyvinyl chloride | 100 parts by weight |
| DOP | 48 |
| Epoxy Soybean Oil | 2 |
| Zn-Octoate | 0.3 |
| Ca-Stearate | 0.3 |
| Mg-Stearate | 0.3 |
| Acetylbenzoylmethane | 0.1 |
| Sample | 0.5 |

TABLE 3

| | | HEAT STABILITY (190° C.) (YELLOWNESS) | | | | |
|---|---|---|---|---|---|---|
| NO. | SAMPLE | 0 min. | 15 min. | 30 min. | 60 min. | 120 min |
| Control 2-1 | None | 10 | 14 | 18 | 24 | 60 |
| Sample 2-1 | $Ca_3(PO_4)_2 \cdot 3Ca(OH)_2$ | 4 | 6 | 8 | 12 | 34 |
| 2-2 | $Mg_3(PO_4)_2 \cdot 3MgO$ | 6 | 8 | 8 | 16 | 38 |
| 2-3 | $Zn_3(PO_4)_2 \cdot ZnO$ | 6 | 6 | 10 | 18 | 38 |
| 2-4 | $Ca_2SiO_4 \cdot 3CaO$ | 6 | 8 | 12 | 20 | 36 |
| 2-5 | $CaSiO_3 \cdot CaO$ | 8 | 10 | 12 | 20 | 36 |
| 2-6 | $BaSiO_3 \cdot 3BaO$ | 8 | 12 | 12 | 18 | 40 |
| 2-7 | $CaHPO_3 \cdot 5Ca(OH)_2$ | 6 | 8 | 10 | 14 | 38 |
| 2-8 | $Ba_3(PO_4)_2 \cdot 5BaO$ | 6 | 10 | 10 | 14 | 36 |
| 2-9 | $Ca_3(PO_4)_2$ + $Ca(OH)_2$ (1:1 Wt. Ratio) | 4 | 6 | 8 | 12 | 36 |
| 2-10 | $Ca_2SiO_4$ + $Ca(OH)_2$ (1:1 Wt. Ratio) | 6 | 8 | 10 | 14 | 36 |

As shown by the tabulated results, the resistance of these environmentally acceptable flexible PVC compositions to yellowing is very much enhanced by the combined use of the inorganic base compound and betadiketone compound components of the stabilizer composition of this invention. All of the example 2-1 through 2-10 samples heated 30 minutes at 190° C. were less yellowed than Control 2-1 heated 15 minutes, thus representing at least doubled resistance to yellowing. Moreover, all samples had remarkable good initial color and protection thereof in the first part of the heat exposure; with one exception, 15 minutes heated samples according to the invention were no more yellow than Control 2-1 *before* 190 C. oven exposure.

EXAMPLE 3

The same test as Example 1 was carried out in accordance with the following formulation.

The results are shown in Table 4.

| (FORMULATION | |
|---|---|
| PVC | 100 parts by weight |
| DOP | 40 |
| Chlorinated polyethylene | 20 |
| Chlorinated parafine | 10 |
| $CaCO_3$ | 20 |
| Clay | 10 |
| Ca-stearate | 0.5 |
| Zn-stearate | 0.3 |
| $Ca_3(PO_4)_2$ | 0.5 |
| $Ca(OH)_2$ | 2.5 |

TABLE 4

| No. | Beta-diketone | HEAT STABILITY (190° C.) (YELLOWNESS) | | | | | |
|---|---|---|---|---|---|---|---|
| | | 0 min. | 15 min | 30 min. | 60 min | 120 min | 180 min. |
| Control | | | | | | | |
| 3-1 | None | 8 | 12 | 16 | 24 | 60 | — |
| EXAMPLE | | | | | | | |
| 3-1 | No. 2 (Table 1) | 4 | 6 | 8 | 10 | 20 | 54 |
| 3-2 | No. 4 (Table 1) | 4 | 8 | 10 | 12 | 22 | 52 |
| 3-3 | No. 5 (Table 1) | 5 | 8 | 10 | 12 | 22 | 56 |
| 3-4 | No. 6 (Table 1) | 8 | 7 | 8 | 10 | 24 | 54 |
| 3-5 | No. 7 (Table 1) | 6 | 8 | 8 | 2 | 22 | 54 |
| 3-6 | No. 11 (Table 1) | 5 | 8 | 10 | 14 | 24 | 54 |
| 3-7 | No. 12 (Table 1) | 4 | 6 | 6 | 10 | 18 | 52 |
| 3-8 | No. 13 (Table 1) | 6 | 10 | 10 | 14 | 20 | 54 |
| 3-9 | No. 15 (Table 1) | 5 | 7 | 8 | 14 | 24 | 54 |
| 3-10 | No. 20 (Table 1) | 4 | 6 | 6 | 10 | 18 | 52 |
| 3-11 | No. 21 (Table 1) | 5 | 7 | 10 | 14 | 24 | 54 |
| 3-12 | No. 22 (Table 1) | 6 | 7 | 12 | 12 | 22 | 54 |
| 3-13 | No. 24 (Table 1) | 8 | 8 | 10 | 12 | 24 | 56 |

As shown by these test results, the plasticized PVC formulation of Example 3, whose heat stability problem is complicated by the presence of chlorinated polyethylene and chlorinated paraffin modifiers as well as calcium carbonate and clay fillers, is remarkably well protected against both yellowing and drastic failure by the combination of inorganic base (tricalcium phosphate and calcium hydroxide) with betadiketone compound according to this invention. Thus examples 3-1 through 3-13 samples heated 30 minutes are no more yellowed than the control 3-1 sample heated 15 minutes; examples 3-1 through 3-13 samples heated 180 minutes are less yellowed than control 3-1 samples heated 120 minutes, and similarly for other period comparisons.

EXAMPLE 4

The same test as Example-1 was carried out in accordance with following formulation.
the results are shown in Table 5.

(FORMULATION)

| | |
|---|---|
| PVC | 50 parts by weight |
| Chlorinated Polyethylene | 50 |
| Trioctyltrimellitate | 50 |
| $CaCO_3$ | 20 |
| Clay | 10 |
| Ba-stearate | 0.3 |
| Zn-stearate | 0.2 |
| Dibenzoylmethane | 0.1 |
| Sample | 4.0 |

TABLE 5

| No. | SAMPLE | HEAT STABILITY (190° C.) (YELLOWNESS) | | | | | |
|---|---|---|---|---|---|---|---|
| | | 0 min | 15 min | 30 min | 60 min | 20 min | 180 min |
| Control | | | | | | | |
| 4-1 | NONE | 8 | 16 | 24 | 40 | 65 | — |
| 4-2 | Tribasic lead Sulfate (5.0) Pb-stearate (0.5) without Ba-stearate or Zn. stearate | 8 | 9 | 9 | 12 | 16 | 32 |
| Example | | | | | | | |
| 4-1 | $Ca_3(PO_4) \cdot 5Ca(OH)_2$ | 4 | 4 | 5 | 7 | 10 | 22 |
| 4-2 | $Ba_3(PO_4)_2 \cdot 8BaO$ | 4 | 5 | 5 | 5 | 12 | 22 |
| 4-3 | $MgSiO_3 \cdot 3MgO$ | 6 | 6 | 7 | 8 | 12 | 26 |
| 4-4 | $Ca_2SiO_4 \cdot 3CaO$ | 6 | 6 | 6 | 8 | 12 | 24 |
| 4-5 | $BaSO_4 \cdot 5Ba(OH)_2$ | 4 | 5 | 5 | 7 | 12 | 24 |
| 4-6 | $Al_2(SO_4)_3 \cdot Al_2O_3$ | 4 | 5 | 7 | 8 | 14 | 24 |
| 4-7 | $Ca(OH)_2$ | 6 | 6 | 7 | 8 | 14 | 26 |
| 4-8 | $Ba(NO_2)_2 \cdot 5BaO$ | 6 | 7 | 7 | 7 | 12 | 24 |
| 4-9 | $Ba_3(PO_4)_2$ + $Ba(OH)_2$ (1:1 by weight) | 4 | 5 | 5 | 7 | 10 | 22 |

The above results demonstrate the truly remarkable effectiveness of the combination of this invention in suppressing yellowing as compared to otherwise identical compositions except for the omission of the inorganic base (control 4-1 ) or to compositions containing instead of the barium and zinc organic stabilizers the long accepted combination of lead stearate and tribasic lead sulfate. Even 60 minutes heated samples of example 4-1 through 4-9 compositions were no more yellow than control 4-1 or control 4-2 samples before any oven exposure !

EXAMPLE 5

The same test as Example 1 was carried out in accordance with the following formulation. The results are shown in Table 6.

(FORMULATION)

| | |
|---|---|
| PVC | 80 parts by weight |
| ABS (acrylonitrile- | 20 |

-continued (FORMULATION)

| | |
|---|---|
| butadiene-styrene polymer) | |
| DOP | 25 |
| EPOXYSOYBEAN OIL | 5.0 |
| Zn-Octoate | 0.5 |
| Stearic Acid | 0.5 |
| $Ca_3(PO_4)_2 \cdot 3Ca(OH)_2$ | 0.5 |
| Sample | 0.1 |
| Ba-Nonylphenate | 1.5 |

TABLE 6

| No. | 1,3-Diketone | HEAT STABILITY (190° C. YELLOWNESS) | | | | |
|---|---|---|---|---|---|---|
| | | 0 min | 15 min | 30 min | 60 min | 120 min |
| Control | | | | | | |
| 5-1 | None | 24 | 26 | 26 | 60 | — |
| Example | | | | | | |
| 5-1 | No. 1 (Table 1) | 8 | 8 | 10 | 22 | 58 |
| 5-2 | No. 3 (Table 1) | 8 | 10 | 10 | 24 | 60 |
| 5-3 | No. 7 (Table 1) | 10 | 10 | 12 | 22 | 60 |
| 5-4 | No. 10(Table 1) | 10 | 12 | 12 | 22 | 58 |
| 5-5 | No. 12(Table 1) | 8 | 8 | 8 | 18 | 52 |
| 5-6 | No. 16(Table 1) | 10 | 12 | 14 | 22 | 58 |
| 5-7 | No. 17(Table 1) | 8 | 10 | 12 | 24 | 58 |
| 5-8 | No. 18(Table 1) | 8 | 10 | 10 | 24 | 56 |
| 5-9 | No. 20(Table 1) | 6 | 8 | 8 | 16 | 54 |
| 5-10 | No. 24(Table 1) | 8 | 8 | 12 | 20 | 58 |

As shown by the above results, the PVC-ABS polymer blend is remarkably well protected against yellowing by the use of inorganic base and betadiketone compound in combination according to this invention. Even 60 minute heated samples of Example 5-1 through 6-10 compositions are no more yellowed than Control 5-1 samples milled but not oven exposed.

EXAMPLE 6

In order to examine the combination effect of the stabilizer compositions of the present invention with other additives, the same test as Example-1 were carried out in accordance with the following formulation. The results are shown in Table 7.

(Formulation)

| | |
|---|---|
| PVC | 100 parts by weight |
| DOP | 70 |
| Zn-octoate | 0.5 |
| Ba-Stearate | 0.5 |
| $Ca_2SiO_4 \cdot 8Ca(OH)_2$ | 0.5 |
| Tribenzoylmethane | 0.05 |
| Other additives | 0.1 |

TABLE 7

| No. | Other Addities | HEAT STABILITY (190° C. YELLOWNESS) | | | | CLARITY |
|---|---|---|---|---|---|---|
| | | 0 min | 30 min | 60 min | 120 min | |
| Control | | | | | | |
| 6-1 | None | 6 | 16 | 24 | 58 | Good |
| Example | | | | | | |
| 6-1 | ESBO | 4 | 12 | 16 | 50 | Very Good |
| 6-2 | Epoxidizedpolybutadiene | 5 | 12 | 16 | 52 | Very Good |
| 6-3 | BHT | 5 | 14 | 16 | 54 | Very Good |
| 6-4 | DLTDP | 4 | 14 | 14 | 52 | Very Good |
| 6-5 | Trisnonylphenyl phosphite | 4 | 12 | 16 | 52 | Very Good |
| 6-6 | Octyldiphenylphosphite | 4 | 12 | 15 | 52 | Very Good |
| 6-7 | Diphenyl urea | 5 | 15 | 16 | 53 | Very Good |
| 6-8 | 1,4-butanediol bis(aminocrotonate) | 4 | 14 | 16 | 54 | Very Good |
| 6-9 | Nitrilotriacetic acid tributyl amide | 4 | 12 | 14 | 50 | Very Good |
| 6-10 | Tetra(12–15C alkyl) bisphenol-A-diphosphite | 4 | 12 | 14 | 52 | Very Good |
| 6-11 | 2-phenylindole | 5 | 15 | 18 | 53 | Very Good |
| 6-12 | Pentaerythritol | 5 | 14 | 18 | 54 | Very Good |
| 6-13 | Bisphenol-A | 5 | 15 | 16 | 54 | Good |
| 6-14 | Dibutyltin maleate | 4 | 14 | 16 | 54 | Very Good |
| 6-15 | Dibutyltin bis(isooctylthioglycolate) | 5 | 14 | 20 | 50 | Very Good |
| 6-16 | Bis(dioctyltin laurate) maleate | 5 | 14 | 18 | 53 | Very Good |

As shown by the above results, the additional stabilizer compounds used in Examples 6-1 through 6-16 are effective in further improving the resistance to yellowing and clarity obtainable with a combination of betadiketone compound and inorganic base compound in accordance with this invention.

EXAMPLE 7

In order to examine the anti-yellowing effect of beta-diketone metal complexes in the composition of the present invention, samples of 20×15 mm were cut off from the sheet of 1 mm in thickness prepared by calendering and compression molding in accordance with the following formulation. Initial color and color of sheets after heating at 190° C. for 30 min. were measured. The heat stability test in a Geer oven at 190° C. was carried out. Initial color and color of sheets shown in Table-8 are the yellowness determined with the Hunter Colorimeter.

(Formulation)

| | |
|---|---|
| Polyvinyl chloride (Geon 103EP) | 100 parts by weight |
| Ba-stearate | 0.3 |
| Ca-stearate | 0.5 |
| 5 Ca(OH)$_2$ · CaSO$_4$ · ½H$_2$O | 2.0 |
| 1,3-diketone metal complex | 0.1 |

TABLE 8

| No. | 1,3-Diketone Metal Complex | Initial Color | Color of Sheets After Heating | Heat Stability |
|---|---|---|---|---|
| Control | | | | |
| 7-1 | None | 12 | 18 | 75 |
| 7-2 | Ca-ethylacetoacetate | 15 | 20 | 100 |
| Example | | | | |
| 7-1 | Dibenzoylmethane · Ca | 6 | 8 | 115 |
| 7-2 | Dibenzoylmethane · Zn | 6 | 8 | 110 |
| 7-3 | Benzoylacetylmethane · Zn | 7 | 8 | 105 |
| 7-4 | Benzoylacetylmethane · Mg | 7 | 8 | 110 |
| 7-5 | Diacetylmethane · Ca | 8 | 10 | 105 |
| 7-6 | Diacetylmethane · Sr | 8 | 10 | 105 |
| 7-7 | Dibenzoylmethane · Li | 4 | 7 | 100 |
| 7-8 | Dibenzoylmethane · Na | 4 | 7 | 100 |
| 7-9 | Dibenzoylmethane · K | 4 | 7 | 100 |
| 7-10 | Dibenzoylmethane | 8 | 12 | 90 |

The results demonstrate the remarkable effectiveness according to the invention of the betadiketone compounds, nine metal complexes and a free diketone, in preventing yellowing while also augmenting long term heat stability at 190° C. was combined with an inorgaic metal base compound. The comparison with clacium ethylacetoacetate of control 7-2 shows that the betadiketone compounds in the composition of this invention work in a different way. Calcium ethylacetoacetate provides an increase in heat stability (from 75 minutes without to 100 with), but at the cost of poorer initial color and poorer color after 30 minutes heating, a generous test period in terms of actual heat exposure of PVC articles during fabrication. In contrast, the PVC samples containing compositions of this invention such as basic calcium sulfate with dibenzoylmethane or betaketone metal complexes are characteized by excellent initial color and preservation of this during 30 minutes at 190° C., with no compromise of long term heat stability. Remarkably, all samples containing an anti-yellowing composition of this invention were no more yellow after 30 minutes at 190° C. than that initial color of the control sample without betadiketone compound.

EXAMPLE 8

The same test as Example-7 was carried out in accordance with the following formulation. The results are shown in Table 9.

(Formulation)

| | |
|---|---|
| Polyvinyl chloride (Geon 103EP) | 100 parts by weight |
| TiO$_2$ | 1.0 |
| Low molecularweightpolyethylene | 0.5 |
| Dibutyltin-3-mercaptopropionate | 0.1 |
| Ca-stearate | 1.0 |
| Mg-stearate | 0.5 |
| Dibenzoylmethane · Zn | 0.3 |
| Metal basic inorganic compound | 1.0 |

TABLE 9

| No. | Metal basic Inorganic Compound | Initial Color | Color of Sheets After Heating | Heat Stability |
|---|---|---|---|---|
| Control | | | | |
| 8-1 | none | 15 | 30 | 60 |
| 8-2 | Ca$_3$(PO$_4$)$_2$ | 15 | 30 | 75 |
| Example | | | | |
| 8-1 | Ca$_3$(PO$_4$)$_2$ · 3Ca(OH)$_2$ | 6 | 10 | >120 |
| 8-2 | Mg$_3$(PO$_4$)$_2$ · 3MgO | 4 | 8 | " |
| 8-3 | Zn$_3$(PO$_4$)$_2$ · ZnO | 6 | 10 | " |
| 8-4 | Ca$_2$SiO$_4$ · 3CaO | 8 | 12 | " |
| 8-5 | CaSiO$_3$ · CaO | 6 | 10 | " |
| 8-6 | BaSiO$_3$ · 3BaO | 8 | 14 | " |
| 8-7 | CaHPO$_3$ · 5Ca(OH)$_2$ | 6 | 12 | " |
| 8-8 | Ba$_3$(PO$_4$)$_2$ ·5BaO | 6 | 12 | " |
| 8-9 | Ca$_3$(PO$_4$)$_2$ + (1:1) by Ca(OH)$_2$ weight) | 4 | 8 | " |
| 8-10 | Ca$_2$SiO$_4$ (1:1 by + weight) Ca(OH)$_2$ | 5 | 10 | " |
| 8-11 | MgO | 8 | 16 | " |

The test results demonstrate the importance of the basic inorgaic compound component of the anti-yellowing composition of this invention in this rigid PVC formulation. Normal tricalcium phosphate as shown by control 8-2 has no effect on yellowing and only a modest favorable effect on long term heat stability. The basic inorganic metal compounds used in examples 8-1 through 8-10 cut down on yellowing to the point where 30 minute heated samples are less yellow than unheated samples of control 8-1 and 8-2, while also contributing extended heat stability.

EXAMPLE 9

Test pieces were prepared in accordance with following formulation. Heat stability test in a Geer oven at 190° C. was carried out, and volume resistivity (VR:ohm cm) at 30° C. was measured. The results are shown in Table 10

(Formulation)

| | |
|---|---|
| PVC | 100 parts by weight |
| DOP | 50 |
| CaCO$_3$ | 20 |
| Clay | 10 |
| Ba-stearate | 0.5 |
| Zn-stearate | 0.3 |
| Ca$_3$(PO$_4$)$_2$ | 0.5 |
| Ca(OH)$_2$ | 2.5 |
| 1,3-diketone compound | 0.1 |

TABLE 10

| No. | 1,3-diketone compound | Heat Stability Yellowed Min. | Heat Stability Blackened Min. | VR ohm cm ×10$^{13}$ |
|---|---|---|---|---|
| Control | | | | |

TABLE 10-continued

| No. | 1,3-diketone compound | Heat Stability | | VR ohm cm $\times 10^{13}$ |
|---|---|---|---|---|
| | | Yellowed Min. | Blackened Min. | |
| 9-1 | None | 10 | 170 | 8.4 |
| 9.2 | Dehydroacetic acid | 30 | 180 | 1.2 |
| Example | | | | |
| 9-1 | Dibenzoylmethane · Ca | 60 | >180 | 64.2 |
| 9-2 | Dibenzoylmethane · Zn | 60 | " | 65.2 |
| 9-3 | Dibenzoylmethane · Ba | 65 | " | 51.8 |
| 9-4 | Dibenzoylmethane · Sr | 65 | " | 55.6 |
| 9-5 | Dibenzoylmethane · Al | 60 | " | 58.2 |
| 9-6 | Dibenzoylmethane · Sb | 55 | " | 66.6 |
| 9-7 | Octanoyl · acetylmethane · Ca | 50 | " | 48.2 |
| 9-8 | Octanoyl · acetylmethane · Zn | 50 | " | 50.6 |
| 9-9 | Dibenzoylmethane | 40 | 180 | 5.0 |

The outstanding resistance to yellowing as well as long term heat stability and volume resistivity contributed by the inorgaic basic metal compound + betadiketone compound composition according to this invention is evident from the test results shown.

EXAMPLE 10

Test sheets were prepared in accordance with following formulation. The color of sheets after heating at 190° C. for 0 min., 30 min, and 120 min. and color of sheets after compressing at 170° C. for 10 min. and 30 min were measured, and VR at 30° C. were measured. The results are shown in Table 11.

(Formulation)

| PVC | 100 parts by weight |
|---|---|
| DOP | 40 |
| 50% chlorinated parafine | 15 |
| $CaCO_3$ | 20 |
| Clay | 10 |
| Ba-stearate | 0.3 |
| Zn-stearate | 0.2 |
| Dibenzoylmethane · Ca | 0.1 |
| Metalbasic inorganic compound | 3.0 | color control during heat exposure in air, color control during heat exposure in the absence of air, as in molding, and volume restivity) than a lead based formulation representative of many years industrial practice or a control formulation lacking one component of the composition of this invention.

EXAMPLE 11 the test sheets were prepared in accordance with the following formulation. Initial color and color of the sheets after heating at 190° C. for 60 min were measured, and heat stability test in a Geer oven at 190° C. was carried out. Initial color and color of sheets shown in Table 6 are the yellowness determinded with the Hunter Colorimeter. The results are shown in Table 12.

(Formulation)

| PVC | 80 parts by weight |
|---|---|
| ABS | 20 |
| DOP | 20 |
| ESBO | 3.0 |
| Ba-nonylphenate | 1.5 |
| Zn-octoate | 0.5 |
| Stearic Acid | 0.5 |
| $Ca_3(PO_4)_2 \cdot 3Ca(OH)_2$ | 0.5 |
| 1,3-diketone metal complex | 0.1 |

TABLE 11

| | | Color of Sheets (YELLOWNESS) | | | | | VR (ohm cm) $\times 10^{13}$ |
|---|---|---|---|---|---|---|---|
| | Metal Basic | Heating at 190° C. | | | Compressing at 170° C. | | |
| No. | Inorganic Compound | 0min | 30min | 120min | 10min | 30min | |
| Control | | | | | | | |
| 10-1 | None | 15 | 45 | 75 | 20 | 50 | — |
| 10-2 | Tribase(3.0) Pb-stearate(0.5 except Ba-St & Zn-St | 10 | 15 | 22 | 10 | 20 | 30.2 |
| Example | | | | | | | |
| 10-1 | $Ca_3(PO_4)_2 \cdot 5Ca(OH)_2$ | 8 | 10 | 15 | 8 | 12 | 51.6 |
| 10-2 | $Ba_3(PO_4)_2 \cdot 8BaO$ | 9 | 12 | 17 | 10 | 15 | 48.6 |
| 10.3 | $MgSiO_3 \cdot 3MgO$ | 8 | 12 | 17 | 8 | 13 | 54.2 |
| 10-4 | $CaSiO_4 \cdot 3CaO$ | 8 | 10 | 15 | 8 | 15 | 46.4 |
| 10-5 | $BaSO_4 \cdot 5Ba(OH)_2$ | 7 | 10 | 14 | 8 | 12 | 56.2 |
| 10-6 | $Al_2((SO_4))_3 \cdot Al_2O_3$ | 9 | 12 | 18 | 10 | 14 | 42.8 |
| 10.7 | $Ca(OH)_2$ | 8 | 12 | 17 | 10 | 15 | 48.6 |
| 10-8 | $Ba(NO_2)_2 \cdot 5BaO$ | 9 | 12 | 17 | 10 | 15 | 48.6 |
| 10-9 | $Ba_3(PO_4)$ + (1:5) $Ba(OH)_2$ by weight | 8 | 12 | 17 | 8 | 12 | 55.2 |

These results demonstrate the surprising ability of anti-yellowing compositions of this invention to provide PVC formulations better in all respects (initial color,

TABLE 12

| No. | 1,3-diketone metal complex | Initial Color | Color of Sheet | Heat Stability Min. |
|---|---|---|---|---|
| Control | | | | |
| 11-1 | None | 28 | 42 | 95 |
| 11-2 | Dehydroacetic acid · Zn | 15 | 35 | 100 |
| Example | | | | |
| 11-1 | Dibenozylmethane · Zn | 6 | 18 | 120 |
| 11-2 | Lauroyl · Benzoylmethane · Zn | 8 | 20 | 115 |
| 11-3 | Benzoyl · acetyl · octylmethane · Zn | 8 | 20 | 115 |
| 11-4 | Bis(4-methoxybenzoyl)methane · Zn | 6 | 16 | 120 |
| 11-5 | Bis(4-chlorobenzoyl)methane · Zn | 6 | 16 | 120 |
| 11-6 | Benzoyl · trifluoroacetylmethane · Zn | 8 | 18 | 115 |
| 11-7 | Diacetylmethane · Zn | 10 | 22 | 110 |
| 11-8 | Dipivaloylmethane · Zn | 10 | 26 | 110 |
| 11-9 | Stearoyl · acetylmethane · Zn | 10 | 24 | 110 |
| 11-10 | Benzoyl · acetyl · phenylmethane · Zn | 11 | 25 | 115 |

These results show that the above PVC-ABS polymer blend is remarkably well protected against yellowing by the combination of inorganic metal base compound and betadiketone zinc complex accoding to this invention. The 60 minute heated samples of Examples 11-1 through 11-9 had less color than the control 11-1 sample without any betadiketone compound before any heat exposure, and were also better in all properties tested than control sample 11-2 containing a zinc complex not of this invention.

We claim:

1. An anti-yellowing additive for minimizing the yellowing tendency when heated at 190° C. of environmentally acceptable stabilized vinyl chloride polymer compositions from which arsenic, cadmium, lead, mercury, and thallium are substantially excluded, comprising in combination (A) at least one basic inorganic oxide, hydroxide, phosphate, phosphite, nitrate, nitrite, or sulfate of at least one of the metals lithium, sodium, potassium, magnesium, calcium, strontium, barium, zinc, titanium, aluminum, zirconium, or tin having in the presence of 100 parts of water per part a pH in the range of 7.4 to 13; and (B) for each part by weight of basic inorganic compound 0.01 to 1 part by weight of a 1,3-diketone compound represented by the formula

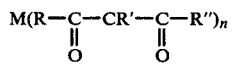

in which R is a hydrocarbon group, a halohydrocarbon group, an alkoxyhydrocarbon group or an alkylenedioxyhydrocarbon group or an alkylenedioxyhydrocarbon group having 1 to 18 carbon atoms; R' is a hydrogen atom, an acyl group

where R''' is alkyl or a hydrocarbon group having 1 to 18 carbon atoms; R'' is a hydrogen atom or a hydrocarbon group, a halohydrocarbon group, an alkoxyhydrocarbon group, or an alkylenedioxyhydrocarbon group having 1 to 18 carbon atoms; M is hydrogen or a metal selected from the group consisting of lithium, sodium, potassium, strontium, barium, zinc, aluminum, and antimony; and n is an integer from 1 to 3 depending on the valence of M.

2. An anti-yellowing additive according to claim 1 in which the basic inorganic compound is a basic aluminum sulfate.

3. An anti-yellowing additive according to claim 2 in which the basic inorganic compound is a basic calcium phosphate.

4. An anti-yellowing additive according to claim 2 in which the basic inorganic compound is a basic barium phosphate.

5. An anti-yellowing additive according to claim 2 in which the basic inorganic compound is a basic barium nitrite.

6. An anti-yellowing additive according to claim 1 in which the basic inorganic compound is a Group II metal oxide or hydroxide.

7. An anti-yellowing additive according to claim 6 in which the basic inorganic compound is magnesium oxide.

8. An anti-yellowing additive according to claim 6 in which the basic inorganic compound is calcium oxide.

9. An anti-yellowing additive according to claim 6 in which the basic inorganic compound is calcium hydroxide.

10. An anti-yellowing additive according to claim 6 in which the basic inorganic compound is barium oxide.

11. An anti-yellowing additive according to claim 6 in which the basic inorganic compound is barium hydroxide.

12. An anti-yellowing additive according to claim 6 in which the basic inorganic compound is zinc oxide.

13. An anti-yellowing additive according to claim 1 in which in the formula of the 1,3-diketone compound M is hydrogen.

14. An anti-yellowing additive according to claim 1 in which in the formula of the 1,3-diketone compound M is zinc.

15. An anti-yellowing additive according to claim 1 in which in the formula of the 1,3-diketone compound M is an alkali metal.

16. An anti-yellowing additive according to claim 1 in which the formula of the 1,3-diketone compound R and R'' are alkyl groups.

17. An anti-yellowing additive according to claim 1 in which the formula of the 1,3-diketone compound at least one of R and R'' is an aryl group.

18. An anti-yellowing additive according to claim 1 in which the 1,3-diketone compound is a lithium, sodium, potassium, strontium, barium, zinc, aluminum, or antimony compound of dibenzoylmethane.

19. An enviromentally acceptable stabilized vinyl chloride polymer composition protected against yellowing and from which arsenic, cadmium, lead, mercury, and thallium are substantially excluded, comprising a vinyl chloride polymer, a stabilizing amount of at least one heat stabilizer, and from 0.02 to 20 parts by weight per 100 parts by weight of vinyl chloride polymer of an anti-yellowing additive according to claim 1.

20. A vinyl chloride polymer composition according to claim 19 in which the vinyl chloride polymer is a homopolymer of vinyl chloride.

21. A vinyl chloride polymer composition according to claim 19 in which the vinyl chloride polymer is a copolymer of vinyl chloride and a comonomer selected from the group consisting of propylene, ethylene, 1-hexene, vinyl acetate, diethyl maleate, and diethyl fumarate.

22. A vinyl chloride polymer composition according to claim 19 in which the heat stabilizer is a barium, calcium, magnesium, or zinc salt of a non-nitrogenous monocarboxylic acid having 6 to 24 carbon atoms or a hydrocarbon-substituted phenol having 10 to 30 carbon atoms.

23. A vinyl chloride polymer composition according to claim 19 in which the heat stabilizer is an epoxidized triglyceride.

* * * * *